United States Patent
Ranta-Aho et al.

(10) Patent No.: US 10,477,443 B2
(45) Date of Patent: Nov. 12, 2019

(54) CELL SELECTION DEPENDING ON MBMS CAPABILITY

(75) Inventors: Karri Markus Ranta-Aho, Espoo (FI); Jarkko T. Koskela, Oulu (FI); Henri Markus Koskinen, Espoo (FI); Johanna Katariina Pekonen, Espoo (FI); Woonhee Hwang, Espoo (FI)

(73) Assignee: HMD Global Oy, Espoo (FI)

( * ) Notice: Subject to any disclaimer, the term of this patent is extended or adjusted under 35 U.S.C. 154(b) by 209 days.

(21) Appl. No.: 14/005,661

(22) PCT Filed: Apr. 13, 2011

(86) PCT No.: PCT/EP2011/055827
§ 371 (c)(1),
(2), (4) Date: Sep. 17, 2013

(87) PCT Pub. No.: WO2012/139639
PCT Pub. Date: Oct. 18, 2012

(65) Prior Publication Data
US 2014/0010142 A1    Jan. 9, 2014

(51) Int. Cl.
*H04W 36/02* (2009.01)
*H04W 36/00* (2009.01)
(Continued)

(52) U.S. Cl.
CPC ..... *H04W 36/026* (2013.01); *H04W 36/0007* (2018.08); *H04W 36/0061* (2013.01);
(Continued)

(58) Field of Classification Search
CPC .......... H04W 36/0061; H04W 36/026; H04W 76/002; H04W 72/005
(Continued)

(56) References Cited

U.S. PATENT DOCUMENTS

| | | | | |
|---|---|---|---|---|
| 2004/0147266 A1* | 7/2004 | Hwang | ............... | H04W 72/005 455/445 |
| 2005/0090278 A1* | 4/2005 | Jeong | ............... | H04W 36/0055 455/525 |

(Continued)

FOREIGN PATENT DOCUMENTS

| | | |
|---|---|---|
| CN | 1748386 B | 5/2013 |
| EP | 1 509 056 A2 | 2/2005 |

(Continued)

OTHER PUBLICATIONS

Jeong, Cell reselection method for receiving packet data in a mobile communication system supporting MBMS, Feb. 23, 2005, Euporian Patent Application, EP1509056 A2.*

(Continued)

*Primary Examiner* — Kibrom T Hailu
*Assistant Examiner* — Nizam U Ahmed
(74) *Attorney, Agent, or Firm* — Harrington & Smith

(57) ABSTRACT

A method of mobility management in a cellular system includes determining from a first received indication that at least one communication device intends to receive a multimedia broadcast multicast service or is receiving a multimedia broadcast multicast service. The information is sent to the at least one communication device relating to at least one multimedia broadcast multicast service capable cell. The method further includes receiving from the at least one communication device a report including measurement information of the at least one multimedia broadcast multicast service capable cell. The method finally includes initiating selecting at least one cell on at least one carrier for the at least one communication device, the at least one carrier including one or more cells capable of providing a multimedia broadcast multicast service.

38 Claims, 9 Drawing Sheets

(51) Int. Cl.
*H04W 72/00* (2009.01)
*H04W 76/40* (2018.01)
*H04W 48/20* (2009.01)

(52) U.S. Cl.
CPC .......... *H04W 48/20* (2013.01); *H04W 72/005* (2013.01); *H04W 76/40* (2018.02)

(58) Field of Classification Search
USPC ....................................................... 370/312
See application file for complete search history.

(56) References Cited

U.S. PATENT DOCUMENTS

| | | | |
|---|---|---|---|
| 2005/0118992 A1* | 6/2005 | Jeong ...................... | H04W 4/06 455/422.1 |
| 2005/0286472 A1* | 12/2005 | Lee ...................... | H04W 72/005 370/331 |
| 2007/0030830 A1* | 2/2007 | Sagne ................... | H04L 12/189 370/336 |
| 2007/0218930 A1* | 9/2007 | Kuo ...................... | H04W 72/005 455/466 |
| 2008/0049663 A1* | 2/2008 | Voyer ................... | H04L 12/185 370/328 |
| 2008/0123570 A1* | 5/2008 | Yin ........................ | H04W 88/06 370/280 |
| 2008/0267109 A1 | 10/2008 | Wang et al. | |
| 2008/0268878 A1* | 10/2008 | Wang ..................... | H04W 68/00 455/458 |
| 2009/0168683 A1* | 7/2009 | Franceschini ......... | H04W 72/14 370/312 |
| 2009/0180417 A1* | 7/2009 | Frost ................... | H04W 72/005 370/312 |
| 2010/0075667 A1* | 3/2010 | Nakamata et al. ......... | 455/432.3 |
| 2010/0080160 A1* | 4/2010 | Kazmi ................ | H04W 72/005 370/312 |
| 2010/0216469 A1* | 8/2010 | Yi et al. ...................... | 455/435.3 |
| 2010/0272004 A1* | 10/2010 | Maeda .................. | H04L 5/0007 370/312 |
| 2011/0013515 A1* | 1/2011 | Lecompte ..................... | 370/235 |
| 2012/0182921 A1* | 7/2012 | Tsuboi .................. | H04W 4/021 370/312 |

FOREIGN PATENT DOCUMENTS

| | | | | |
|---|---|---|---|---|
| EP | 1 509056 A2 | * | 2/2005 | |
| EP | 1509056 A2 | * | 2/2005 | ........ H04W 36/0055 |
| EP | 1 874 075 A2 | * | 1/2008 | |
| EP | 1874075 A2 | * | 1/2008 | ........ H04W 36/0055 |
| JP | 2004312750 A | | 11/2004 | |
| JP | 2007502573 A | | 2/2007 | |
| WO | WO2004073256 | | 8/2004 | |
| WO | WO 2008155915 A1 | | 12/2008 | |

OTHER PUBLICATIONS

3GPP, 3GPP TS 36.300 v10.3.0(Mar. 2011), Stage 2 (Release 10).*
Kim, Method for cell reselection in an MBMS mobile communication system, Euporian Patent Application, Apr. 7, 2004, EP1874075 A2.*
3GPP, Technical Specification group radio access network, 3GPP, TS 36.300 V10.3.0 (Mar. 2011), p. 1-75.*
Source Title Document for 3GPP TSG-RAN WG2 #73bis Shanghai, China, Apr. 11-15, 2011; R2-112367: LG Electronics Inc. Priority Handling for MBMS Service Continuity Discussion and Decision.*
3GPP TSG-RAN WG2 Meeting #58bis, Orlando, United States, Jun. 25-29, 2007, R2-072415, "Enabling techniques for MBMS service continuity", Nokia, Nokia Siemens Networks, 7 pgs.
3GPP TS 25.331 V10.3.1 (Apr. 2011), "3rd Generation Partnership Project; Technical Specification Group Radio Access Network; Radio Resource Control (RRC); Protocol specification (Release 10)", pp. 527-547.
3GPP TS 36.300 V10.3.0 (Mar. 2011), "3rd Generation Partnership Project; Technical Specification Group Radio Access Network; Evolved Universal Terrestrial Radio Access (E-UTRA) and Evolved Universal Terrestrial Radio Access network (E-UTRAN); Overall description.; Stage 2 (Release 10)", 197 pgs.
3GPP TSG-RAN WG2 #73bis R2-112367 Shanghai, China, Apr. 11-15, 2011 LG Electronics Inc. ; Priority Handling for MBMS Service Continuity.
3GPP TSG-RAN2 Meeting #68 Jeju, South Korea, Nov. 9-13, 2009; R2-096563; Change Request 36.304 CR CRNum; Nokia Corporation, Nokia Siemens Networks.
3GPP TSG-RAN WG2 Meeting #73 R2-110800; Taipei, Feb. 21-25, 2011; Change Request 36.331 CR 0534 Stage-3 CR for MBMS enhancement.
TSG-RAN Meeting 51 RP-110452 Kansas City, USA, Mar. 15-18, 2011 Source: Huawei Title: Proposed WID: Service continuity in connected mode and location information for MBMS for LTE.

* cited by examiner

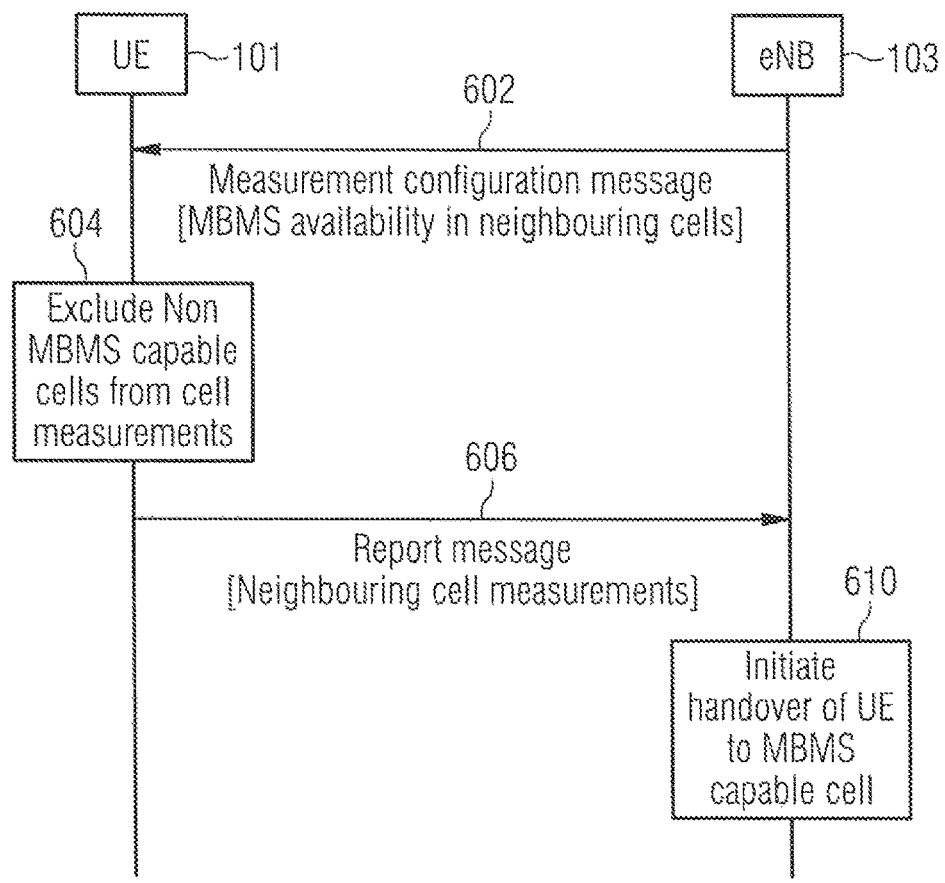

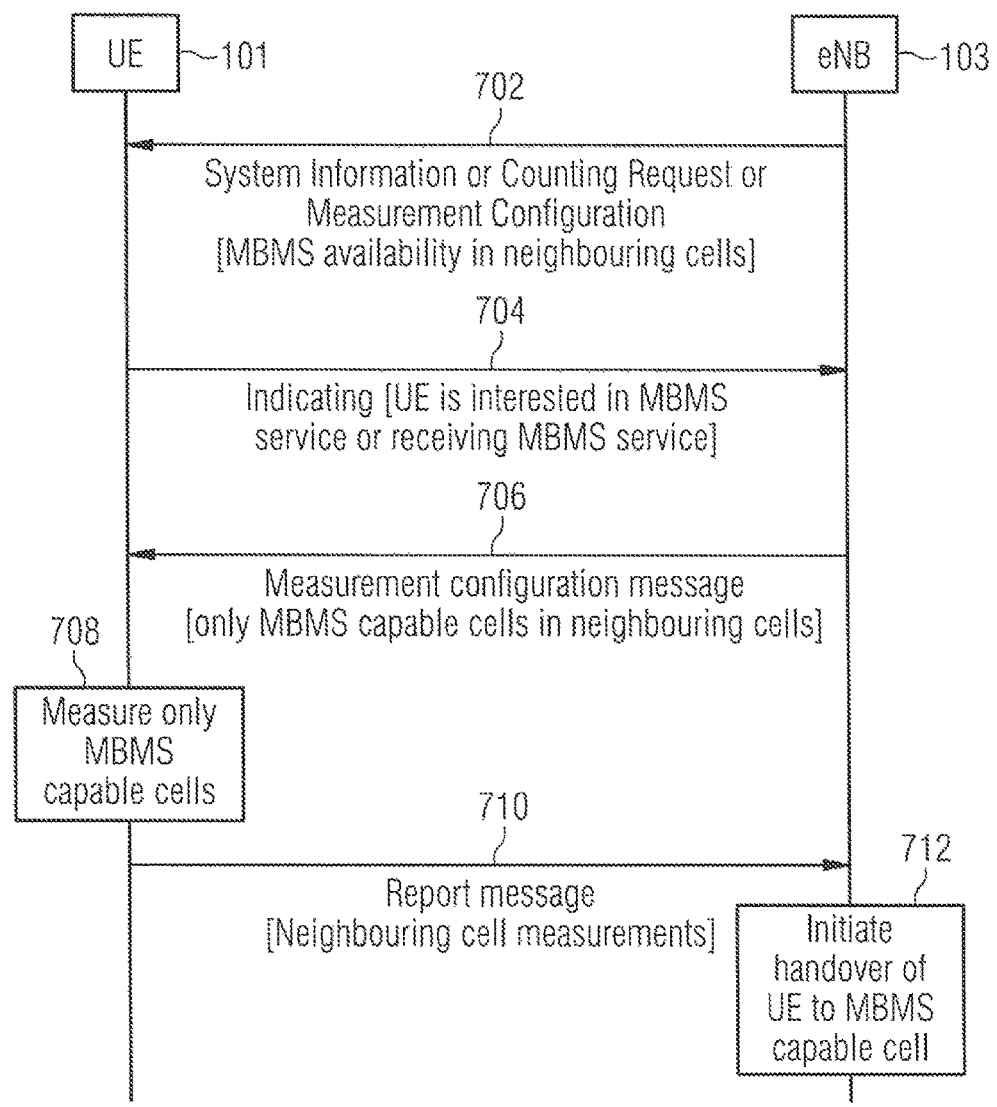

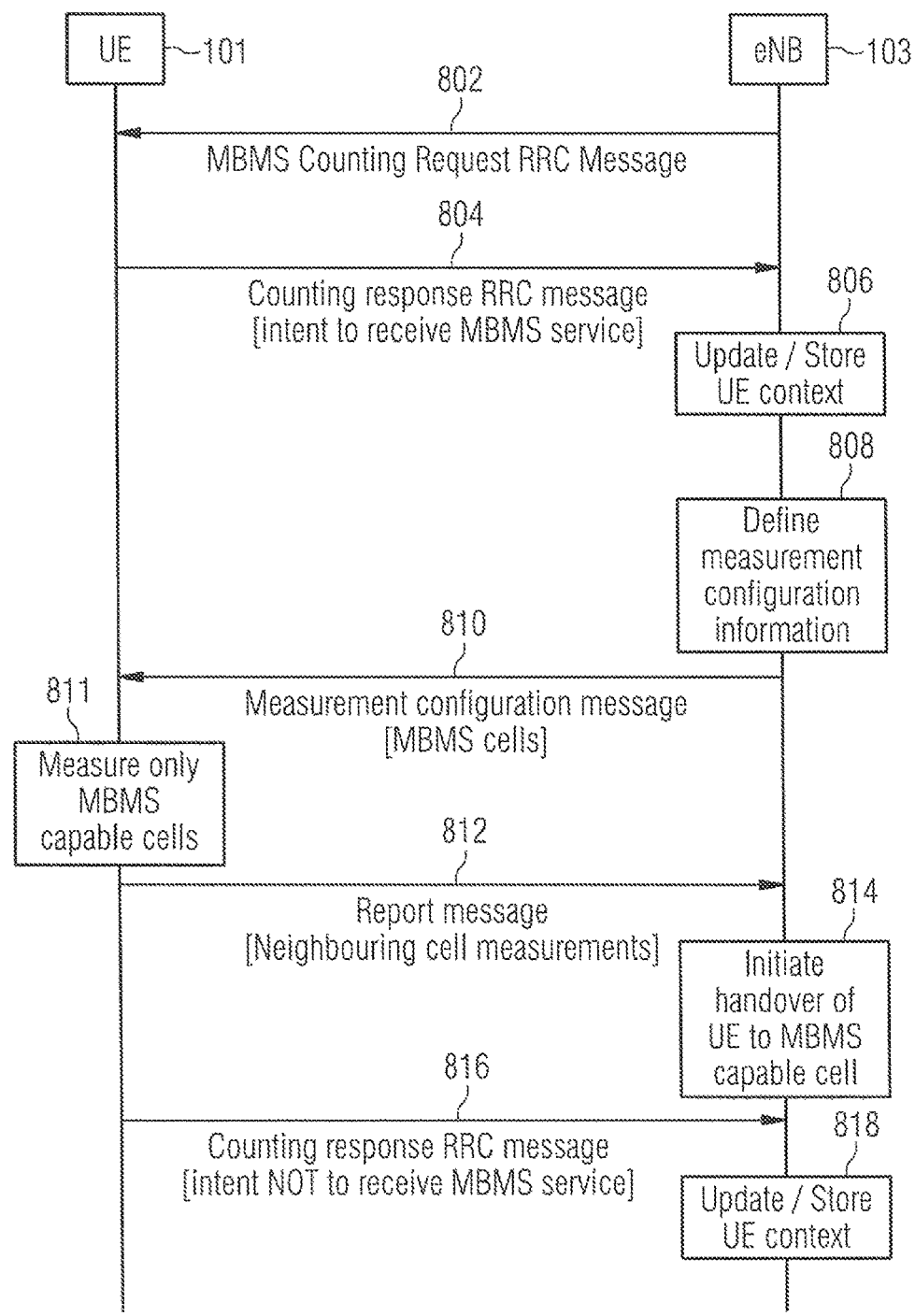

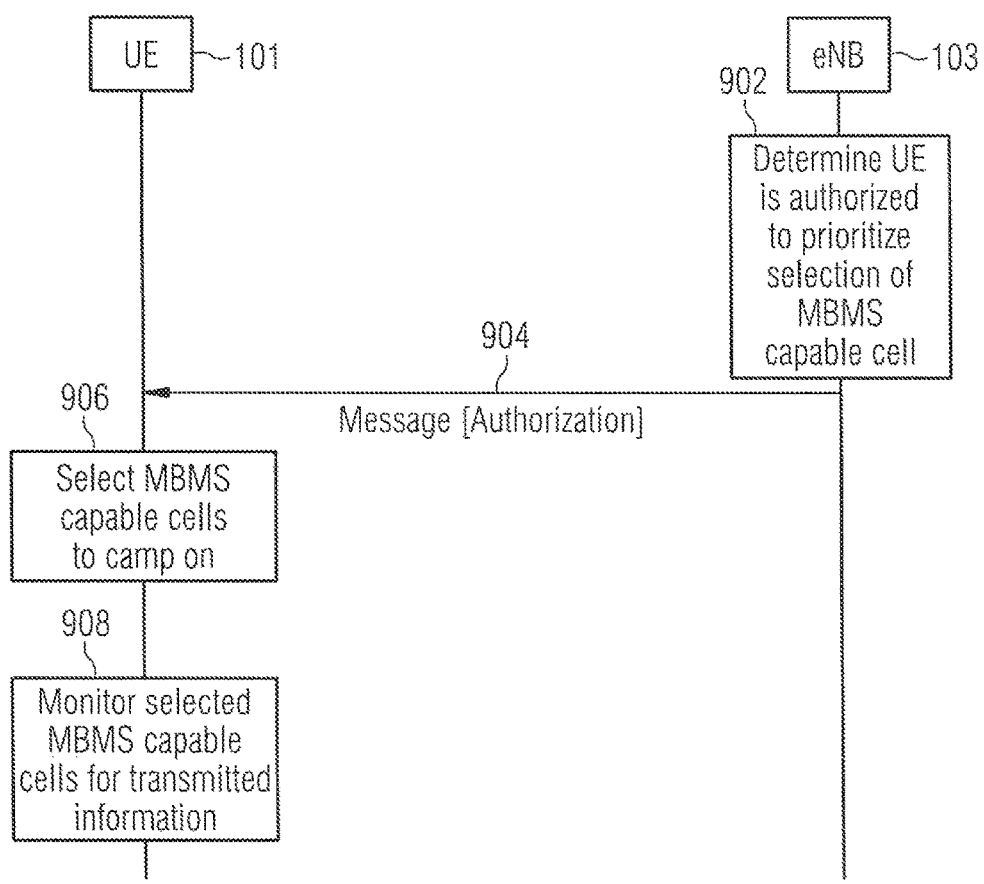

CELL SELECTION DEPENDING ON MBMS CAPABILITY

FIELD OF THE INVENTION

The invention relates to mobility management of communication devices in a communication network and in particular to mobility management of communication devices receiving multicast and/or broadcast signals.

BACKGROUND OF THE INVENTION

A communication system can be seen as a facility that enables communication sessions between two or more entities such as fixed or mobile communication devices, base stations, servers and/or other communication nodes. A communication system and compatible communicating entities typically operate in accordance with a given standard or specification which sets out what the various entities associated with the system are permitted to do and how that should be achieved. For example, the standards, specifications and related protocols can define the manner how communication devices can access the communication system and how various aspects of communication shall be implemented between communicating devices. A communication can be carried on wired or wireless carriers. In a wireless communication system at least a part of the communication between at least two stations occurs over a wireless link.

Examples of wireless systems include public land mobile networks (PLMN) such as cellular networks, satellite based communication systems and different wireless local networks, for example wireless local area networks (WLAN). A wireless system can be divided into cells, and hence these are often referred to as cellular systems. A cell is provided by a base station. Cells can have different shapes and sizes. A cell can also be divided into sectors. Regardless of the shape and size of the cell providing access for a user, and whether the access is provided via a sector of a cell or a cell, such area can be called radio service area or access area. Neighbouring radio service areas typically overlap, and thus a communication in an area can listen to more than one base station.

A user can access the communication system by means of an appropriate communication device. A communication device of a user is often referred to as user equipment (UE) or terminal. A communication device is provided with an appropriate signal receiving and transmitting arrangement for enabling communications with other parties. Typically a communication device is used for enabling receiving and transmission of communications such as speech and data. In wireless systems a communication device provides a transceiver station that can communicate with another communication device such as e.g. a base station of an access network and/or another user equipment. The communication device may access a carrier provided by a station, for example a base station, and transmit and/or receive communications on the carrier.

An example of communication systems attempting to satisfy the increased demands for capacity is an architecture that is being standardized by the 3rd Generation Partnership Project (3GPP). This system is often referred to as the long-term evolution (LTE) of the Universal Mobile Telecommunications System (UMTS) radio-access technology. The LTE aims to achieve various improvements, for example reduced latency, higher user data rates, improved system capacity and coverage, reduced cost for the operator and so on. A further development of the LTE is often referred to as LTE-Advanced. The various development stages of the 3GPP LTE specifications are referred to as releases.

In LTE-Advanced the network nodes can be wide area network nodes such as a macro eNodeB (eNB) which may, for example, provide coverage for an entire cell. Alternatively in LTE-Advanced, network nodes can be small area network nodes such as pico eNodeBs (pico-eNB). Small area network nodes may be configured to support local offload and may support any UE or UEs belonging to a closed subscriber group (CSG) or an open subscriber group (OSG). Pico eNBs can, for example, be configured to extend the range of a cell. In some instances a combination of wide area network nodes and small area network nodes can be deployed using the same frequency carriers (e.g. co-channel deployment) to provide overlapping cell layers.

One aspect of LTE-Advanced is that a Multimedia Broadcast/Multicast Service (MBMS) for a Universal Mobile Telecommunications System (UMTS) can be provided. The MBMS uses broadcast or multicast message distribution instead of several point-to-point links for communicating to several end user equipments.

A UE that operates in a UMTS or LTE network can obtain communication services using procedures according to a standard defined by the 3GPP. The standard specifies, for both of these networks, radio system parameters, data transfer procedures, network protocols, control messages and bearer traffic exchange to take place over the air interface. The MBMS can allow efficient session management by enabling service data packets to be transferred in an efficient way to multiple UEs within these networks. For this purpose, a message can be transmitted from a core network node to several node Bs (nBs). Each NB can then send a unidirectional point-to-multipoint (PtM) transmission to UEs so that a UE in an idle or active mode receives network service data.

In a multicarrier environment an MBMS broadcast/multicast may be configured for a certain cell layer to provide efficient radio resource usage for the MBMS broadcast/multicast. At certain locations in a communications network there may be multiple cell layers with different cell sizes provided by different base stations. Certain mobility management rules of the network may determine that UEs are handed over to smaller base stations providing smaller cell layers whereas other UEs are kept on macro cell layers. A problem can arise if the network does not know about the UE being able to receive MBMS broadcasts/multicasts. The network can hand the UE over to another cell layer which does not support MBMS broadcasts/multicasts which can disrupt MBMS reception for the user equipment.

STATEMENT OF INVENTION

Embodiments of the invention aim to address one or several of the above issues.

In accordance with an embodiment there is provided a method comprising determining from a first received indication that at least one communication device intends to receive a multimedia broadcast multicast service or is receiving a multimedia broadcast multicast service; sending information to the at least one communication device relating to at least one multimedia broadcast multicast service capable cell; receiving from the at least one communication device a report comprising measurement information of the at least one multimedia broadcast multicast service capable cell; and initiating selecting at least one cell on at least one carrier for the at least one communication device, the at least one carrier comprising one or more cells capable of providing a multimedia broadcast multicast service.

This means that the network can determine information about the communication device's intentions for using a multimedia broadcast multicast service.

In some embodiments the selected cell is a multimedia broadcast multicast service capable cell. In other embodiments the selected cell is a multimedia broadcast multicast service non-capable cell, but the carrier which the multimedia broadcast multicast service non-capable cell also comprises multimedia broadcast multicast service capable cells. In this way a multimedia broadcast multicast service capable cell can be selected after a multimedia broadcast multicast service non capable cell has been selected.

In accordance with a more detailed embodiment, method may comprise excluding information related to one or more cells, on one or more carriers, which do not support multimedia broadcast multicast service for selection based on the intention of the at least one communication device. The information can be measurement configuration information to be sent to the at least one communication device.

The first received indication to receive the multimedia broadcast multicast service can be received in response to a request sent to the communication device. The request may be sent to the communication device is sent continuously. In a more detailed embodiment the request can be an MBMS Counting Request RRC message broadcast on an MBMS control channel. Additionally or alternatively the response can be an MBMS Counting Response RRC message. Furthermore, the MBMS Counting Request RRC message and/or the MBMS Counting Response RRC message may be compatible with LTE Rel-10 communication devices.

A user equipment context can be updated in response to the received intention to receive the multimedia broadcast multicast service.

The method can comprise receiving a second indication from the at least one communication device that the at least one communication device no longer intends to receive a multimedia broadcast multicast service.

The user equipment context can be updated in response to the second received indication.

The selecting can comprise selecting a neighbouring cell, on at least one carrier, capable of supporting the multimedia broadcast multicast service for handing the at least one communication device over to.

In a more detail embodiment a list of neighbouring cells may be used for excluding one or more cells. The list can comprise a list of neighbouring cells, on one or more carriers, which are not capable of supporting the multimedia broadcast multicast service. Additionally or alternatively, the list comprises a list of neighbouring cells, on one or more carriers, which are capable of supporting the multimedia broadcast multicast service. The method can be carried out be a network element and preferably an eNodeB.

In accordance with another embodiment there is a method of mobility management in a cellular system comprising: receiving an indication of multimedia broadcast multicast service capability of one or more neighbouring cells; determining cell measurements of the one or more neighbouring cells capable of the multimedia broadcast multicast service; and sending a report comprising the cell measurements of one or more neighbouring cells.

The method can comprise excluding measurements of at least one neighbouring cell if the at least one neighbouring cell does not the support multimedia broadcast multicast service. The excluding can comprise not performing cell measurements for the at least one neighbouring cell which does not support the multimedia broadcast multicast service Additionally or alternatively the excluding may comprise excluding cell measurements of the at least one neighbouring cell which does not support the multimedia broadcast multicast service from the report.

The method can comprise receiving authorization for excluding measurements of the at least one neighbouring cell which does not support the multimedia broadcast multicast service. The method can comprise determining authorization from the indication of the capability of the one or more neighbouring cells.

The method can be performed by a communication device. Preferably the device is in a connected mode.

In accordance with another embodiment there is provided a method of mobility management in a cellular system comprising: determining from a received authorization a communication device is authorized to prioritize for selection at least one cell having multimedia broadcast multicast service capability; selecting the at least one cell on at least one carrier, the at least one carrier comprising one or more cells having multimedia broadcast multicast service capability; and monitoring the selected at least one cell having multimedia broadcast multicast service capability for transmitted information.

The method can comprise searching for one or more cells having multimedia broadcast multicast service capability for selecting on the basis of the received authorization.

The selecting can comprise selecting one or more cells from a received list of multimedia broadcast multicast service capable cells and/or a list of one or more multimedia broadcast multicast service capable frequencies for the at least one communication device to select.

The method can comprise excluding one or more cells for selecting if the one or more cells are not multimedia broadcast multicast service capable. The excluding can comprise not performing measurements of the non multimedia broadcast multicast service capable cells or not selecting the non multimedia broadcast multicast service capable cells.

In accordance with yet another embodiment there is provided a method of mobility management in a cellular system comprising: determining at least one communication device is authorized to prioritize for selection at least one cell having multimedia broadcast multicast service capability; and sending an authorization to the at least one communication device to prioritize for selection the at least one cell having multimedia broadcast multicast service capability and monitor for transmitted information.

The method can comprise sending a list of one or more multimedia broadcast multicast service capable cells and/or a list of one or more multimedia broadcast multicast service capable frequencies for the at least one communication device to select. The method can be carried out by a network element and in particular an eNodeB.

In accordance with yet another embodiment there is provided a method of mobility management in a cellular system comprising: sending a request to a communication device on a multimedia broadcast multicast service control channel; receiving a response to the request from the communication device; determining from the received response indication that at least one communication device intends to receive a multimedia broadcast multicast service or is receiving a multimedia broadcast multicast service; wherein the request sent to the communication device is sent continuously. The method can be performed by a network element and in particular an eNodeB.

A computer program comprising program code means adapted to perform the method may also be provided.

In accordance with yet another embodiment there is provided an apparatus for mobility management in a cellular system comprising: means for determining from a first received indication that at least one communication device intends to receive a multimedia broadcast multicast service or is receiving a multimedia broadcast multicast service; means for sending information to the at least one communication device relating to at least one multimedia broadcast multicast service capable cell; means for receiving from the at least one communication device a report comprising measurement information of the at least one multimedia broadcast multicast service capable cell; and means for initiating selecting at least one cell on at least one carrier for the at least one communication device, the at least one carrier comprising one or more cells capable of providing a multimedia broadcast multicast service.

In accordance with yet another embodiment there is provided an apparatus for mobility management in a cellular system comprising: at least one processor and at least one memory including computer code, the at least one memory and the computer code configured to with the at least one processor cause the apparatus to at least perform: determining from a first received indication that at least one communication device intends to receive a multimedia broadcast multicast service or is receiving a multimedia broadcast multicast service; sending information to the at least one communication device relating to at least one multimedia broadcast multicast service capable cell; receiving from the at least one communication device a report comprising measurement information of the at least one multimedia broadcast multicast service capable cell; and initiating selecting at least one cell on at least one carrier for the at least one communication device, the at least one carrier comprising one or more cells capable of providing a multimedia broadcast multicast service.

The apparatus can be a network element and in particular an eNodeB. The apparatus can comprise means for excluding information related to one or more cells, on one or more carriers, which do not support multimedia broadcast multicast service for selection based on the intention of the at least one communication device.

The apparatus can comprise means for updating the user equipment context in response to the received intention to receive the multimedia broadcast multicast service.

The apparatus can comprise means for receiving a second indication from the at least one communication device that the at least one communication device no longer intends to receive a multimedia broadcast multicast service.

The apparatus can comprise means for updating user equipment context in response to the second received indication.

The means for selecting can select a neighbouring cell, on at least one carrier, capable of supporting the multimedia broadcast multicast service for handing the at least one communication device over to.

In accordance with yet another embodiment there is provided an apparatus of mobility management in a cellular system comprising: means for receiving an indication of multimedia broadcast multicast service capability of one or more neighbouring cells; means for determining cell measurements of the one or more neighbouring cells capable of the multimedia broadcast multicast service; and means for sending a report comprising the cell measurements of one or more neighbouring cells.

In accordance with yet another embodiment there is provided an apparatus for mobility management in a cellular system comprising: at least one processor and at least one memory including computer code, the at least one memory and the computer code configured to with the at least one processor cause the apparatus to at least perform: receiving an indication of multimedia broadcast multicast service capability of one or more neighbouring cells; determining cell measurements of the one or more neighbouring cells capable of the multimedia broadcast multicast service; and sending a report comprising the cell measurements of one or more neighbouring cells.

The apparatus can comprise means for excluding measurements of at least one neighbouring cell if the at least one neighbouring cell does not the support multimedia broadcast multicast service.

The means for excluding can prevent performing cell measurements for the at least one neighbouring cell which does not support the multimedia broadcast multicast service. The means for excluding can exclude cell measurements of the at least one neighbouring cell which does not support the multimedia broadcast multicast service from the report.

The apparatus can comprise means for receiving authorization for excluding measurements of the at least one neighbouring cell which does not support the multimedia broadcast multicast service.

The apparatus can comprise means for determining authorization from the indication of the capability of the one or more neighbouring cells.

The apparatus may be a communication device and preferably a communication device in a connected mode.

In accordance with yet another embodiment there is provided an apparatus of mobility management in a cellular system comprising: means for determining from a received authorization that a communication device is authorized to prioritize for selection at least one cell having multimedia broadcast multicast service capability; means for selecting the at least one cell one at least one carrier, the at least one carrier comprising one or more cells having multimedia broadcast multicast service capability; and means for monitoring the selected at least one cell having multimedia broadcast multicast service capability for transmitted information.

In accordance with yet another embodiment there is provided an apparatus for mobility management in a cellular system comprising: at least one processor and at least one memory including computer code, the at least one memory and the computer code configured to with the at least one processor cause the apparatus to at least perform: determining from a received authorization that a communication device is authorized to prioritize for selection at least one cell having multimedia broadcast multicast service capability; selecting the at least one cell one at least one carrier, the at least one carrier comprising one or more cells having multimedia broadcast multicast service capability; monitoring the selected at least one cell having multimedia broadcast multicast service capability for transmitted information.

The apparatus can comprise means for searching for one or more cells having multimedia broadcast multicast service capability for selecting on the basis of the received authorization.

The means for selecting may be configured to select one or more cells from a received list of multimedia broadcast multicast service capable cells and/or one or more multimedia broadcast multicast service capable frequencies.

The apparatus can comprise means for excluding one or more cells for selecting if the one or more cells are not multimedia broadcast multicast service capable.

The means for excluding may be configured to not perform measurements of the non multimedia broadcast multicast service capable cells or not select the non multimedia broadcast multicast service capable cells.

In accordance with yet another embodiment there is provided an apparatus of mobility management in a cellular system comprising: means for determining that at least one communication device is authorized to select at least one cell having multimedia broadcast multicast service capability; and means for sending an authorization to the at least one communication device to select the at least one cell having multimedia broadcast multicast service capability and monitor for transmitted information.

In accordance with yet another embodiment there is provided an apparatus for mobility management in a cellular system comprising: at least one processor and at least one memory including computer code, the at least one memory and the computer code configured to with the at least one processor cause the apparatus to at least perform: determining that at least one communication device is authorized to select at least one cell having multimedia broadcast multicast service capability; and sending an authorization to the at least one communication device to select the at least one cell having multimedia broadcast multicast service capability and monitor for transmitted information.

The apparatus can comprise means for sending a list of one or more multimedia broadcast multicast service capable cells for the at least one communication device to select and/or a list of one or more multimedia broadcast multicast service capable frequencies for the at least one communication device to select.

In accordance with yet another embodiment there is provided an apparatus of mobility management in a cellular system comprising: means for sending a request to a communication device on a multimedia broadcast multicast service control channel; means for receiving a response to the request from the communication device; and means for determining from the received response indication that at least one communication device intends to receive a multimedia broadcast multicast service or is receiving a multimedia broadcast multicast service; wherein the request sent to the communication device is sent continuously.

In accordance with yet another embodiment there is provided an apparatus for mobility management in a cellular system comprising: at least one processor and at least one memory including computer code, the at least one memory and the computer code configured to with the at least one processor cause the apparatus to at least perform: sending a request to a communication device on a multimedia broadcast multicast service control channel; receiving a response to the request from the communication device; and determining from the received response indication that at least one communication device intends to receive a multimedia broadcast multicast service or is receiving a multimedia broadcast multicast service; wherein the request sent to the communication device is sent continuously.

Various other aspects and further embodiments are also described in the following detailed description and in the attached claims.

BRIEF DESCRIPTION OF THE DRAWINGS

The invention will now be described in further detail, by way of example only, with reference to the following examples and accompanying drawings, in which:

FIG. 6 shows a signalling flow diagram according to some embodiments;

FIG. 7 shows another signalling flow diagram according to some embodiments;

FIG. 8 shows another signalling flow diagram according to some other embodiments; and FIG. 9 shows a signalling flow diagram according to some other embodiments.

DETAILED DESCRIPTION

In the following certain exemplifying embodiments are explained with reference to a wireless or mobile communication system serving mobile communication devices. Before explaining in detail the exemplifying embodiments, certain general principles of a wireless communication system, access systems thereof, and mobile communication devices are briefly explained with reference to FIGS. 1 to 4 to assist in understanding the technology underlying the described examples.

Figure 1:
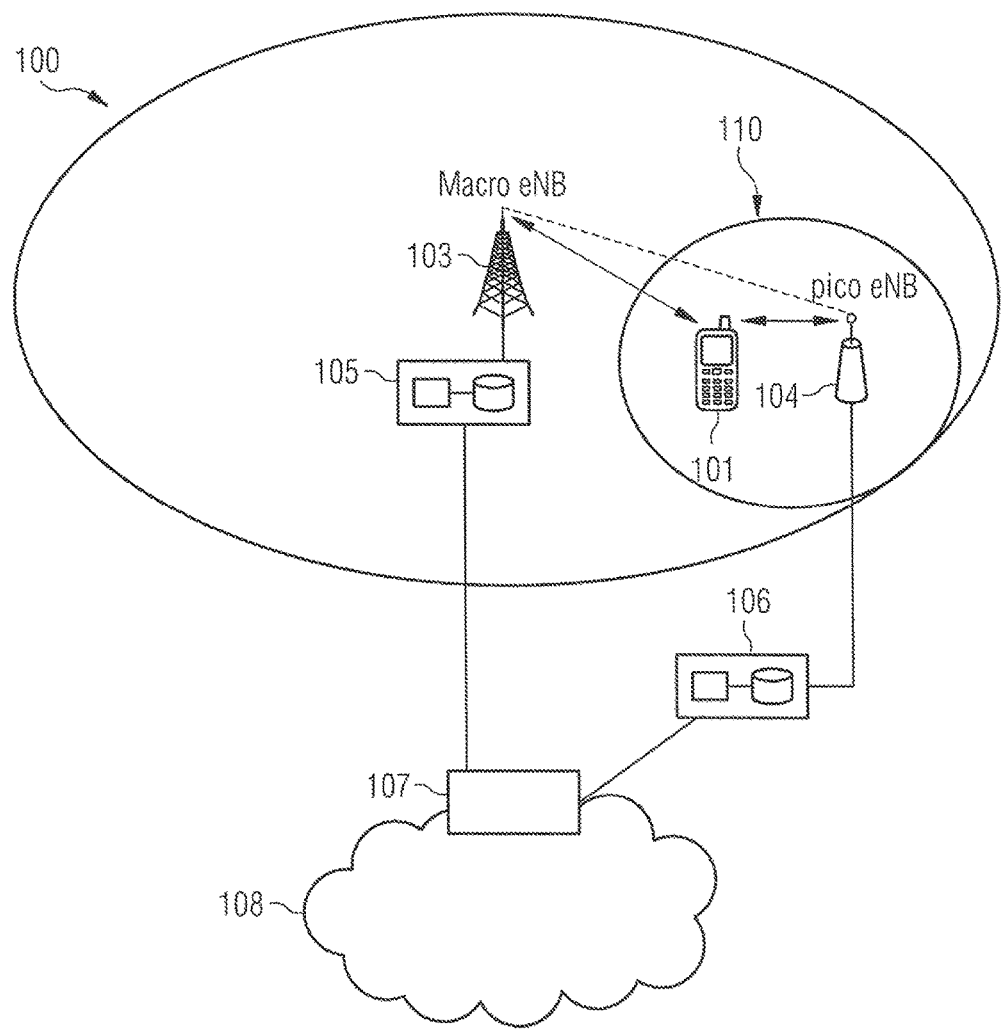
FIG. 1 shows a schematic diagram of a network according to some embodiments.

A mobile communication device or user equipment 101 is typically provided wireless access via at least one base station 103 or similar wireless transmitter and/or receiver node of an access system. In FIG. 1 two neighbouring and overlapping access systems or radio service areas 100, and 110 are shown being provided by base stations 103, and 104.

However, it is noted that instead of two access systems, any number of access systems can be provided in a communication system. An access system can be provided by a cell of a cellular system or another system enabling a communication device to access a communication system. A base station site 103, 104 can provide one or more cells. A base station can also provide a plurality of sectors, for example three radio sectors, each sector providing a cell or a subarea of a cell. All sectors within a cell can be served by the same base station. A radio link within a sector can be identified by a single logical identification belonging to that sector. Thus a base station can provide one or more radio service areas. The mobile communication device 101 and base stations 103, and 104 may have one or more radio channels open at the same time and may send signals to and/or receive signals from more than one source. The base stations 103, 104 can provide overlapping cell layers and in some embodiments there can be a plurality of cell layers of different sizes and characteristics.

Base stations 103, 104 are typically controlled by at least one appropriate controller apparatus 105, 106 so as to enable operation thereof and management of mobile communication devices 101 in communication with the base stations 103, 104. The control apparatuses 105, 106 can be interconnected with each other or other control entities. The control apparatuses 105, 106 can typically provided with memory capacity 301 and at least one data processor 302. The control apparatuses 105, 106 and functions may be distributed between a plurality of control units. In some embodiments, each base station 103, 104, can comprise a control apparatus.

The cell borders or edges are schematically shown for illustration purposes only in FIG. 1. It shall be understood that the sizes and shapes of the cells or other radio service areas may vary considerably from the similarly sized omnidirectional shapes of FIG. 1.

In particular, FIG. 1 depicts a wide area base station 103, which can be a macro-eNB 103. The macro-eNB 103 transmits and receives data over the entire coverage of the cell 100. FIG. 1 also shows a smaller base station or access points which is a pico eNB 104. The coverage of the smaller base stations may generally be smaller than the coverage of the wide area base station. The coverage provided by the smaller node 104 overlap with the coverage provided by the macro-eNB 103. The pico eNB 104 can be used to extend coverage of the macro-eNB 103 outside the original cell coverage 100 of the macro-eNB 103. The pico eNB 104 can also be used to provide cell coverage in "gaps" or "shadows" where there is no coverage within the existing cell 100.

Alternatively or additionally the pico eNB 104 can provide local offload of capacity to the mobile communication device 101. The pico eNB 104 can provide services to only mobile communication devices 104 which are members of a closed subscriber group (CSG). Alternatively the pico eNB 104 can provide services to any mobile communication devices which are within the local area of the pico eNB 104. In some embodiments the pico eNB 104 can be configured for open access or hybrid access.

The communication device 101 can access the communication system based on various access techniques, such as code division multiple access (CDMA), or wideband CDMA (WCDMA). Other examples include time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

A non-limiting example of the recent developments in communication systems is the long-term evolution (LTE) of the Universal Mobile Telecommunications System (UMTS) that is being standardized by the 3rd Generation Partnership Project (3GPP). As explained above, further development of the LTE is referred to as LTE-Advanced. Non-limiting examples of appropriate access nodes are a base station of a cellular system, for example what is known as NodeB (NB) in the vocabulary of the 3GPP specifications. The LTE employs a mobile architecture known as the Evolved Universal Terrestrial Radio Access Network (E-UTRAN). Base stations of such systems are known as evolved Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the user devices. Other examples of radio access system include those provided by base stations of systems that are based on technologies such as wireless local area network (WLAN) and/or WiMax (Worldwide Interoperability for Microwave Access).

In FIG. 1 the base stations 103, 104 of the access systems can be connected to a wider communications network 108. The controller apparatuses 105, 106 may be provided for coordinating the operation of the access systems. A gateway function 107 may also be provided to connect to another network via the network 108. The pico eNodeB 104 can also be connected to the other network by the same gateway function 107. Alternatively the pico-eNB 104 can be connected to the wider network 108 by a separate gateway function (not shown). The base stations 103, 104, can be connected to each other by a communication link for sending and receiving data. The communication link can be any suitable means for sending and receiving data between the base stations 103, 104 and in some embodiments the communication link is an X2 link.

The other network may be any appropriate network for example the Internet or a company intranet. A wider communication system may thus be provided by one or more interconnect networks and the elements thereof, and one or more gateways may be provided for interconnecting various networks.

Figure 2:
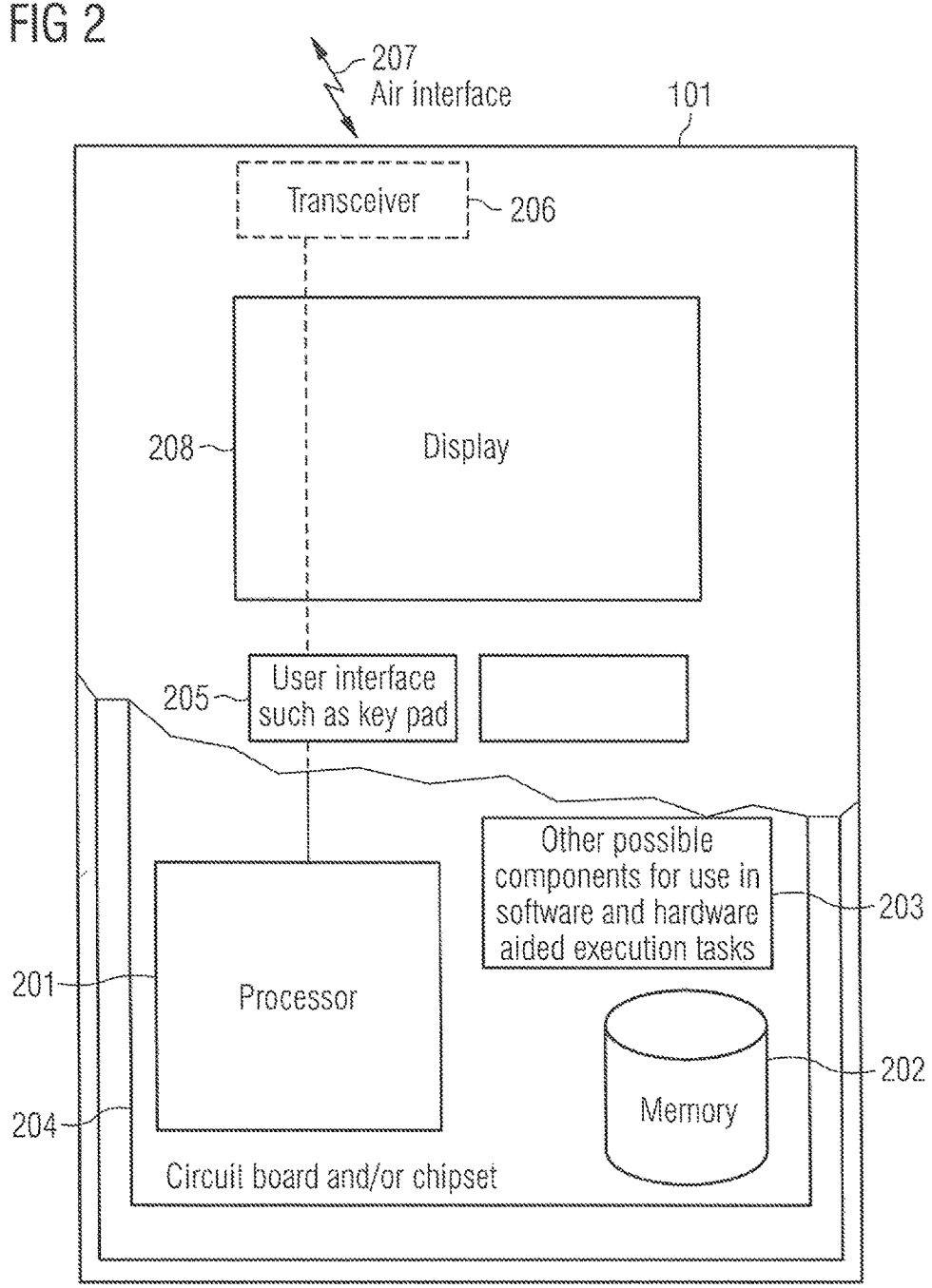
FIG. 2 shows a schematic diagram of a mobile communication device according to some embodiments.

The mobile communication devices will now be described in more detail in reference to FIG. 2. FIG. 2 shows a schematic, partially sectioned view of a communication device 101 that a user can use for communication. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a "smartphone", a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. User may also be provided broadcast or multicast data. Non-limiting examples of the content include downloads, television and radio programs, videos, advertisements, various alerts and other information.

The communication device 101 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

The communication device 101 can be also provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. Possible control functions in view of configuring the mobile communication device for reception and processing of information in association with transmission patterns and for muting signals by means of the data processing facility in accordance with certain embodiments of the present invention will be described later in this description.

The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

Figure 3:
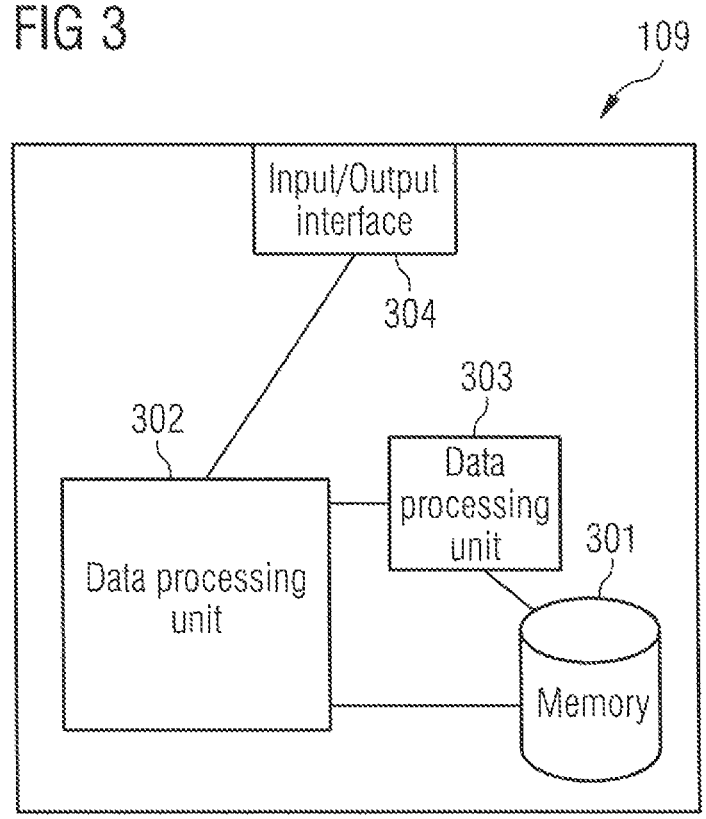
FIG. 3 shows a schematic diagram of a control apparatus according to some embodiments.

FIG. 3 shows an example of the control apparatus 105 or 106 for a communication system, for example to be coupled to and/or for controlling a station 103, 104 of an access system. In some embodiments the base stations 103, 104 comprise a separate control apparatus 105, 106. In other embodiments the control apparatus can be another network element. The control apparatus 105 can be arranged to provide control of communications by mobile communication devices that are in the service area of the system. The control apparatus 105 can be configured to provide control functions in association with generation and communication of transmission patterns and other related information and for muting signals by means of the data processing facility in accordance with certain embodiments described below. For this purpose the control apparatus 105 or 106 can comprises at least one memory 301, at least one data processing unit 302, 303 and an input/output interface 304. Via the interface the control apparatus can be coupled to a receiver and a transmitter of the base station. The control apparatus 105 or 106 can be configured to execute an appropriate software code to provide the control functions.

The required data processing apparatus and functions of a base station apparatus, a communication device and any other appropriate station may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

Figure 4:
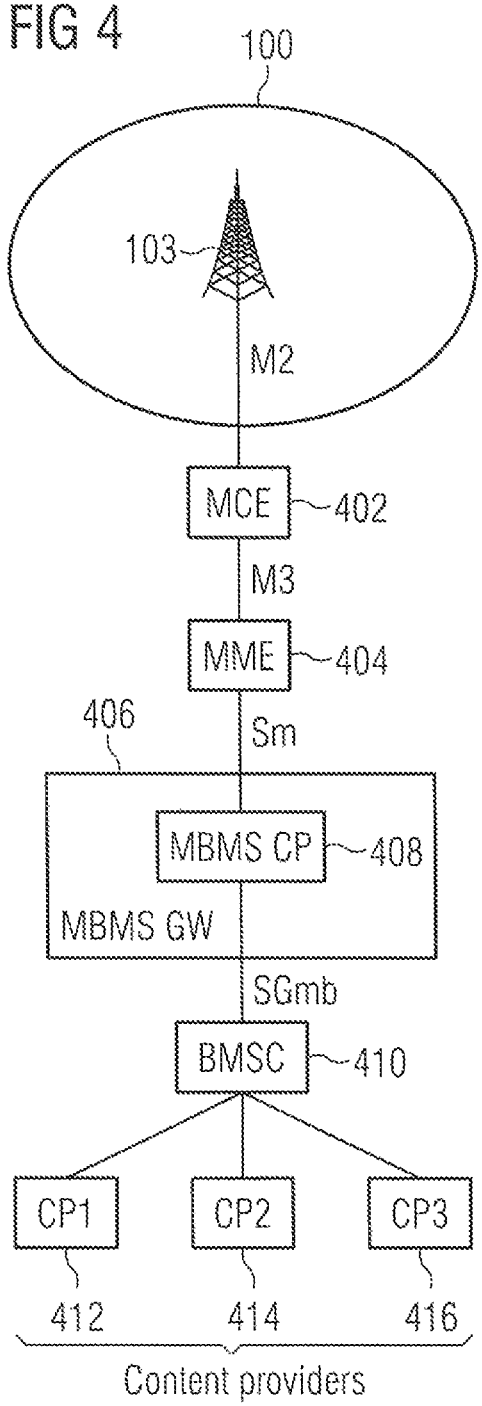
FIG. 4 which illustrates a schematic representation of a multimedia multicasting and broadcasting service network arrangement according to some embodiments.

Reference will now be made to FIG. 4 which illustrates a schematic representation of the multimedia multicasting and broadcasting service network arrangement. In some embodiments the MBMS network arrangement can be part of the arrangement as shown in FIG. 1, but for the purposes of clarity is shown in a separate figure. The base station 103 in radio service area 100 can broadcast multimedia content from one or more content providers 412, 414, 416. The base station 103 can be connected via an M2 connection to MBMS coordination entity 402 which can coordinate an MBMS broadcast among a plurality of base stations in a MBMS single frequency network (MBSFN). In some embodiments there can be one or more base stations in the MBSFN. A mobility management entity (MME) 404 is connected to the MCE via an M3 connection. The MME 404 can determine and coordinate movement of communication devices between one or more radio service areas. The MME 404 receives information associated with the MBMS broadcast via an Sm connection from an MBMS Control-Plane entity 408 within an MBMS gateway (MBMS GW) 406. A broadcast multicast service centre (BMSC) 410 receives content to be broadcast from the content providers 412, 414 and 416 and coordinates the broadcast and sending the data to be broadcast to the MBMS GW 406 via a SGmb connection.

Figure 5:
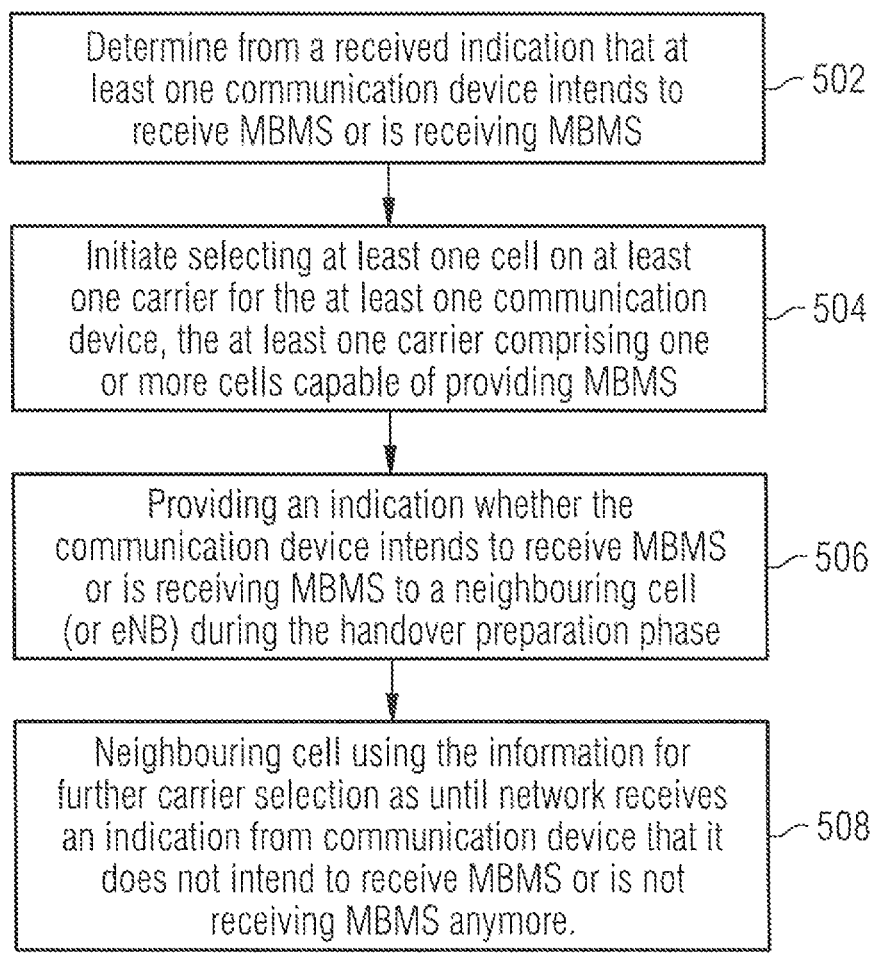
FIG. 5 shows a flow diagram of a method according to some embodiments.

The operation and processes of some embodiments will now be described with reference to FIG. 5. FIG. 5 shows a flow diagram of a method according to some embodiments. A processor 302 of a control apparatus 105 can receive an indication from at least one communication device 101 as shown in block 502 of FIG. 5. The indication can comprise information that the at least one communication device 101 intends to receive an MBMS broadcast. Alternatively the indication can comprise information that the at least one communication device 101 is receiving an MBMS broadcast.

Once the processor 302 of the control apparatus 105 has determined that the communication device 101 is capable of receiving an MBMS broadcast or is actually receiving the MBMS broadcast, the processor 302 initiates selecting at least one carrier for the communication device 101, the at least one carrier being capable of providing an MBMS broadcast/multicast.

In this way processor 302 of the control apparatus 105 can determine information associated with MBMS capabilities of the communication device 101 and whether the communication device 101 has an intention to use an MBMS service on an MBMS carrier. This means the network can handover a communications device 101 to a cell with MBMS capability without interfering with MBMS reception or the ability for a communication device 101 to receive an MBMS service.

Optionally the processor 302 of the control apparatus can send an indication of whether the communication device 101 intends to receive MBMS or is receiving MBMS to one or more neighbouring cells during the handover preparation phase as shown in block 506. As shown in block 508, the neighbouring cell, or target cell can then optionally use the indication for further carrier selection, as shown in block 504, and providing the indication to more target cells as shown in block 506. In some embodiments the target cell or eNodeB can repeat the processes of blocks 504 and 506 until the network receives an indication from the communication device 101 that it does not intend to receive MBMS no longer or the communication device 101 is not receiving MBMS anymore.

Some more detailed embodiments will now be discussed with respect to FIG. 6. FIG. 6 discloses a flow diagram of a method according to some more detailed embodiments.

The processor 302 of the macro eNodeB control apparatus 105 can send a message to the communication device 101 as shown by arrow 602. The message can comprise information about the MBMS availability in one or more neighbouring cells and/or frequencies. In some embodiments the message sent to the communication device 101 can be an implicit authorization for the communication device 101 to perform cell measurements. In some embodiments the message comprising information indicating the availability of MBMS in neighbouring cells can be a measurement configuration message. The cell measurements are performed periodically so that the signal level of cell areas of neighbouring base stations can be determined. Depending on threshold values and the power of the signals of the current cell area and the power of signals of neighbouring cell areas the processor 302 of the control apparatus 105 can initiate handing over the communication device 101.

Once the communication device 101 receives the message comprising information about MBMS availability in neighbouring cells, the communication device can exclude neighbouring cell measurements from neighbours in which MBMS capability is not available as shown by block 604. In some embodiments the processor 201 of the communication device 101 can exclude non-capable MBMS neighbouring cells from a list of neighbouring cells based on the received MBMS capability information. In this way the communication device 101 does not perform cell measurements for cells which the communication device 101 does not want to be handed over to. Additionally or alternatively, the processor 201 of the communication device 101 excludes measurements of neighbouring cells after the neighbouring cell measurements have been performed. In this way the communication device 101 can omit neighbouring measurement results for neighbouring cells for non-capable MBMS cells from report messages sent to the eNodeB 103.

The communication device 101 can then send a report message to the eNodeB as shown by arrow 606. In some embodiments the communication device 101 reports neighbour cell measurements from only cells which offer MBMS capability. The control apparatus 105 of the eNodeB 103 can determine from the report message comprising neighbour cell measurements that the communication device 101 intends to receive an MBMS reception as shown by block 608, similar to block 502 of FIG. 5.

In some embodiments the communication device 101 sends the report message comprising neighbour cell measurements when the communication device is moving in the cell area, or in other words in an active mobility mode.

The control apparatus 105 can then initiate selecting at least one carrier of a neighbouring cell for the communication device 101 when the communication requires handover from the current cell as shown in block 610. The control apparatus 105 determines that the communication device 101 is to be handed over to a cell which is capable of supporting MBMS broadcasts.

In some embodiments the eNodeB 103 can send information to a target base station of the requirement of the communication device 101 to be able to receive an MBMS broadcast. This means the target base station can also know that the communication device 101 intends to receive an MBMS service and can cater for this requirement. In the embodiments discussed with reference to FIG. 6 the user equipment does not need to report anything new to the network and the network does not need to maintain MBMS information specific to the communication device 101. For example the processor 302 of the control apparatus 105 does not need to maintain MBMS information in records about the user equipment, for example in a user equipment context.

In some embodiments, the macro cell layer provided by the macro eNodeB 103 and a pico cell layer provided by the pico eNodeB 104 can be deployed on different carriers. That is, the frequency of the macro cell and the pico cell layer are different. In some embodiments the MBMS broadcast service may be only provided in the macro cell layer. The control apparatus 105 may determine to keep a communication device 101 which is receiving an MBMS broadcast to be kept in the macro cell layer. The eNodeB 103 can inform the communication device 101, which is in a radio resource control connected state, carrier frequencies which contain neighbour cells with MBMS broadcasts. The MBMS availability sent to the communication device 101 from the eNodeB 103 can be part of a measurement configuration message as shown by arrow 602 of FIG. 6. Additionally the different carrier of frequency of the pico cell layer generated by the pico eNodeB 104 can be indicated in the measurement configuration information as not providing MBMS configuration. In some embodiments the indication can state "non-applicable" with respect to the carrier frequency of the pico cell layer providing an MBMS service. In some embodiments the information with regards to the MBMS service availability can be stored in memory.

In the embodiments discussed in reference to FIG. 6 the communication device 101 excludes certain carrier frequencies from the inter-frequency neighbour cell measurements when MBMS reception of the communication device 101 is active.

Some further embodiments will be discussed with reference to FIG. 7. FIG. 7 shows a signalling flow diagram according to some embodiments. In some embodiments a message is sent from the eNodeB 103 to the communication device 101 as shown by arrow 702. In some embodiments the message comprises system information. In other alternative embodiments the request sent from the eNodeB 103 to the communication device 101 is a MBMS Counting Request RRC message or a measurement configuration message.

In response to the message 702 sent from the eNodeB 103 to the communication device 101, message is sent from the communication device 101 to the eNodeB 103 as shown in arrow 704. The message 704 indicates that the communication device is interested in or is receiving the MBMS service. In some embodiments the message comprising the information indicating the intent to receiving the MBMS service can be an MBMS Counting response radio resource control (RRC) message. Alternatively the response message can be any system information message.

The processor 302 of the control apparatus 105 can then generate a measurement configuration message based on the intention of the communication device 101. The control apparatus 105 sends the measurement configuration message to the communication device 101 as shown by arrow 706. In some embodiments the measurement configuration information only comprises information associated with MBMS capable neighbouring cells or MBMS capable cells comprising available MBMS capacity.

Based on the received measurement configuration information, the communication device only measures neighbouring cells which are capable of MBMS as shown by block 708. The communication device 101 then generates and sends a report message comprising neighbouring cells measurements as shown by arrow 710. The report message can comprise only neighbouring cell measurements of neighbouring cells which are capable of MBMS.

The control apparatus 105 can then initiate handover of the communication device 101 to an MBMS capable cell when necessary at a later point.

Some further embodiments will be discussed with reference to FIG. 8. FIG. 8 is similar to FIG. 7 and discloses a signalling flow diagram according to some other embodiments. The communication device 101 can send a message to the eNodeB 103 to indicate an intent to receive an MBMS service. Alternatively the message can comprise information indicating that the communication device 101 is currently receiving an MBMS service. In some embodiments the message sent from a communication device 101 to the eNodeB 103 can be a response to a request sent from the eNodeB 103. The request sent from the eNodeB 103 to the communication device 101 is shown in arrow 802 and the response sent from the communication device 101 to eNodeB is shown in arrow 804. In some embodiments the message comprising the information indicating the intent to receiving the MBMS service can be an MBMS Counting response radio resource control (RRC) message. The response message, in some embodiments can be an MBMS Counting response RRC message.

The control apparatus 105 stores the information of the user equipment's intention to use the MBMS service in memory 301. In some embodiments the control apparatus 105 stores the intention of the communication device to use the MBMS service in the user equipment context as shown in block 806. Additionally or alternatively in some embodiments the control apparatus 105 updates the user equipment context.

The control apparatus 105 determines measurement configuration information as shown in block 808. In some embodiments the control apparatus 105 determines measurement configuration information using the intention of the communication device 101 to use an MBMS service. In this way, the measurement configuration information does not include cells or frequencies thereof which do not support MBMS services.

The eNodeB 103 then sends the measurement configuration information to the communication device 101 as shown in arrow 810. The communication device 101 in response to the measurement configuration information performs measurements of neighbouring cells as shown in block 811, similar to the process as discussed with reference to FIG. 6. Block 811 is the same as block 708 of FIG. 7. The communication device 101 only performs neighbouring cell measurements for those cells which have been specified in the measurement configuration information. In this way the communication device 101 only perform measurements for neighbouring cells, from which the communication device 101 can receive MBMS services. In contrast to the embodiments discussed with reference to FIG. 6, the communication device 101 does not need to perform the step of excluding the neighbouring cell measurements. The communication device 101 then sends a message comprising a report of cell measurements to the eNodeB 103 as shown in step 812.

The control apparatus 105 can the initiate selecting the at least one carrier of a neighbouring cell during handover wherein the neighbouring is capable of providing an MBMS service as shown by block 814. The selecting of the at least one carrier of a neighbouring cell is based on the measurements of the one or more determined base stations which can support MBMS broadcasts/multicasts.

In some embodiments the eNodeB 103 sends the information of the intention of the communication device 101 to use an MBMS service to a target base station during handover. In this way the target base station can also utilise the same information of the intention of the communication device 101. This means that the target base station can continue to provide MBMS capability to the communication device 101.

In some embodiments the communication device 101 can send a message to the eNodeB 103 to indicate that the communication device 101 no longer intends to use an MBMS service as shown in FIG. 8 by arrow 816. The control apparatus in response to receiving a message comprising an indication that the communication device 101 no longer intends to use an MBMS service can update the associated equipment context as shown in block 818. In some embodiments the message comprising the indication can be an MBMS Counting Response RRC message.

Some other embodiments will now be discussed with reference to FIG. 8. As mentioned above, when the communication device 101 is in the radio resource control connected state the communication device 101 can receive an MBMS counting request RRC message represented by the arrow 802 in FIG. 8. In response the communication device 101 can signal an indication that the communication device 101 is interested in receiving the MBMS service and a counting response RRC message can indicate the intent of the communication device 101 to receive the MBMS service. The counting response RRC message is represented by the arrow 804 in FIG. 8. In some embodiments the counting response RRC message may indicate only the MBSFN area to indicate the intent to receive the MBMS service. Additionally or alternatively the communication device 101 can indicate that MBMS reception of the communication device 101 is active or inactive for signalling an intention to use an MBMS service to the network. The communication device 101 receives the counting response RRC message and updates the user equipment context as shown in block 806.

The control apparatus 105 can then exclude the carrier frequencies without MBMS capability from the measurement configuration when the control apparatus defines the measurement configuration information as shown in block 808.

Additionally the communication device 101 can indicate to the eNodeB 103 that it is no longer interested in receiving the MBMS service anymore. In response to a message comprising an indication that the communication device 101 is no longer interested in receiving an MBMS service as shown in arrow 816 the network can remove restrictions from the measurement configuration. For example message represented by arrow 816 can be a MBMS counting response RRC message with all the specified Information Elements signalled as absent in the message, to indicate that the communication device is no longer interested in receiving the MBMS service.

Additionally or alternatively the embodiments discussed in reference to FIG. 8 provide an arrangement whereby the communication device 101 can receive updated measurement configuration messages from the eNodeB 103 depending on the MBMS reception state of the communication device 101. That is the control apparatus 105 of the eNodeB 103 defines the measurements configuration information depending on the MBMS reception state of the communication device.

When the eNodeB 103 sends the updated measurement configuration information to the communication device 101, the communication device 101 receives relevant measurement configuration information. This means that the communication device 101 does not have to perform a step of excluding neighbouring cells from neighbouring cell measurements. Furthermore, a measurement gap, that is a gap in scheduling data for the device for the purpose of inter-frequency measurements will not be configured for useless inter-frequency measurement. However the communication device 101 conforms the eNodeB 103 for any change in the MBMS receptions state of the user equipment 101. Furthermore the communication device 101 supports for specified mobility procedures in idle mode similar to the embodiments discussed with reference to FIG. 6. In this way, when the communication device 101 is in an idle mode the communication device 101 can perform the method discussed with reference FIG. 6 but when the communication device 101 is in an active mode the communication device can perform method with reference to FIG. 8.

In some embodiments there can be a heterogeneous, in terms of available cells, network deployment comprising macro cells enclosing subscriber group cells. The communication device 101 can avoid indicating the proximity of CSG cells associated with the communication device 101 with respect to the state of the MBMS reception of the communication device 101. This means that the control apparatus 105 will not configure any measurements on the CSG carrier.

In some alternative embodiments, similar to the embodiments discussed with reference to FIG. 6, the macro cell layer and the pico cell layer can be both deployed on the same carrier frequency. Similar to previous embodiments the MBMS broadcast may be only offered in the macro cell layer. In this way the control apparatus 105 of the eNodeB 103 can determine that the communication device 101 receiving the MBMS service should be kept in the macro cell layer. In some embodiments the network may not be listening to neighbour cells to determine measurements for intra-frequency measurement configuration. In some embodiments the control apparatus 105 of the eNodeB 103 can define a list of cells of a certain carrier frequency. The neighbouring cell list can define a plurality of cells which do not support MBMS capability. The list of cells which do not support MBMS capability is also known as a "black cell list". Once a control apparatus 105 has determined a specific black cell list which contains the neighbour cells without MBMS broadcast capability, the eNodeB 103 can send a black cell list to the communication device 101 as part of the measurement configuration message 602 as shown in FIG. 6. The communication device 101 can store the black cell list in memory for reference when carrying out neighbouring cell measurements. In this way the communication device 101 can determine whether a neighbour cell is in the black cell list and exclude the neighbouring cell on the black cell list from neighbouring cell measurements.

Alternatively, the control apparatus 105 can determine the measurement configuration information as shown in block 808 of FIG. 8 and update the measurement configuration information based on the black cell list.

In some further alternative embodiments another option is to list only those cells which have MBMS broadcast capability. In this way a list of cells which do support MBMS capability can be thought of as a "white cell list". For example in some circumstances there may be a dense deployment of pico eNodeBs and it may not be feasible to provide a list of all the neighbouring cells which do not support MBMS broadcast. Similarly, the white cell list of pico cell deployments which can support MBMS broadcasts can be sent to the communication device 101 as part of a measurement configuration message 602 of FIG. 6. Alternatively the control apparatus 105 can define measurement configuration information based on a list of pico cells which have MBMS broadcast capability as shown in block 808 of FIG. 8.

In some further embodiments an X2 set up procedure can indicate information about MBMS broadcast support in neighbouring cells/eNodeBs. This means that the eNodeB 103 is able to identify which neighbouring cells are part of the same MBSFN area. The control apparatus 105 can use the information concerning which neighbouring cells are part of the same MBSFN when preparing the measurement configuration information for the communication device 101.

Alternatively or additionally the eNodeB 103 can be informed about neighbouring cells which support MBMS capability using an MBMS coordination entity 402. A single MCE 402 controls a certain MBSFN area and therefore the MCE 402 may knows which eNodeBs are part of a certain MBSFN area. In some embodiments the eNodeB 103 checks for each neighbouring cell from the MCE 402 if that cell is part of the same MBSFN. Alternatively the MCE 402 delivers to the eNodeB 103 a full list of all cells and all eNodeBs part of the same MBSFN areas. Providing information about MBMS broadcast capability of neighbouring eNodeBs during setup can avoid signalling long cell identity lists during operation.

Some further embodiments will now be discussed with reference to FIG. 8. In some embodiments the MBMS counting request as shown by arrow 802 may be broadcast identifying MBMS services. In some embodiments the MBMS counting request can be broadcast continuously and in this way the MBMS counting request is always on. In some embodiments the MBMS counting request is transmitted a plurality of times during a period. In other embodiments the MBMS counting request can be sent periodically in a plurality of sub-frames. In some embodiments the MBMS counting request is broadcast on an MBMS control channel (MCCH) that does not inform a communication device 101 about any MBMS services being broadcast in a cell. Indeed, in some embodiments, the MBMS Counting Request can be continuously sent on a carrier different from carriers on which MBMS services are broadcast. In this way, no communication device 101 will continuously receive a particular MCCH broadcasting an always on MBMS counting request, which would result in communication devices 101 responding continuously.

In response to receiving the MBMS counting request 802 the communication devices 101 respond with an MBMS counting response indicating that services which the communication device 101 is interested in as shown by arrow 804 of FIG. 8. In this way, the user equipment 101 informs the eNodeB 103 of the intent of the communication device 101 to use the MBMS service. This means the network can ensure that the communication device 101 is handed over to a frequency carrier where is can receive the MBMS service in parallel with a unicast service. In some embodiments the communication device 101 may not indicate to the network an intent to use MBMS services. In this case, the communication device may not receive the MBMS counting request after the first reception on the MCCH unless the communication device 101 find an MCCH change notification (e.g. because Counting Requests for new services appear). This means that the always-on Counting Request will not result in repeated responses from the communication devices 101.

In some embodiments, the "always-on" Counting Requests and Counting Requests of Rel 10 can be both applied in parallel. In some embodiments the always-on counting requests cannot be announced on an MCCH that also indicates control information about MBMS services broadcast on the same carrier.

This is to avoid communication devices regularly responding to the counting requests. The Rel 10 counting requests are reported by the eNodeB 103 to the MCE 402 so that the MCE can aggregate the counting results to derive information about service popularity. In some embodiments the eNodeB 103 does not forward the counting results of the always on counting requests but uses counting response from the communication devices 101 responding to the always on counting requests to determine if a communication device should be handed over to the frequency carrier providing a service of interest.

In some circumstances the communication device 101 may not be in an RRC_connected state and the communication device 101 can find and select a carrier providing MBMS broadcasts. In some embodiments the communication device can note a MBMS counting request and re-check the MCCH after a period of time. The communication device 101 then determines in response to a MBMS counting request to send information comprising the intent of the communication device 101 of using the MBMS service.

A communication device 101 may have dismissed a counting request because the communication device 101 was in an RRC_idle state. This means that the communication device 101 may request an RRC connection before it has reselected to an MBMS carrier. In this case the communication device 101 can re-check the MCCH and since the MBMS counting request is broadcast continuously the communication device 101 can send a MBMS counting response and inform the network of its intent to use the MBMS service.

In some embodiments the MCCH may carry an MBMS counting request message when the E-UTRAN wishes to count the numbers of user equipments in RRC_connected state that are interested in receiving one or more specific MBMS services. In some embodiments the counting request message can be broadcast as part of the cell's system information. In some embodiments the always on counting request can be broadcast over a given MBSFN comprising a contiguous group of cells. In some embodiments a robust transmission parameter is used for transmitting the MBMS Counting Request so that neighbour cell interference gathered by the communication device is reduced. This means that communication devices 101 in an RRC_idle state can interpret the always on MBMS counting request as an indication to search for MBMS services on cells of other frequencies. This can decrease the need for the communication device 101 for blindly looking for MBMS services and thus decreasing mobile communication device 101 power consumption.

Some other embodiments will now be discussed with reference to FIG. 9. FIG. 9 shows a signalling flow diagram according to some other embodiments. The eNodeB 103 determines that, when in an idle mode, the communication device 101 is authorized to prioritize for selection an MBMS capable cell as shown in block 902. The eNodeB 103 then sends an explicit authorization in a downlink message to the communication device as shown by arrow 904. In some embodiments the downlink message can be a dedicated message to the communication device 101. Alternatively or additionally the downlink message comprising the authorization can be broadcast to one or more communication devices in the radio network area of the eNodeB 103. In some embodiments the message comprising the authorization can be any suitable downlink message.

The communication device 101 receives the authorization. The communication device determines from the authorization that when in an idle mode, the communication device 101 can prioritize for selection a particular cell to monitor. In some embodiments the communication device prioritizes multimedia broadcast multicast service capable cells to camp on. In an idle mode the communication device 101 then selects an MBMS capable cell to camp on as shown in block 906. The communication device 101 can then monitor transmitted information on the selected MBMS capable cell. For example the communication device can monitor paging information.

In some embodiments the communication device receives a list of MBMS capable cells from the eNodeB 103 for selecting from. Additionally or alternatively the device can also receive a list of frequencies capable for supporting MBMS. In some embodiments a message comprises both the authorization and the list of MBMS capable cells. The communication device 101 after receiving the authorization can then exclude non MBMS capable cells from cell measurements and also exclude non MBMS capable cells from selection.

It is noted that whilst embodiments have been described in relation to LTE-Advanced, similar principles can be applied to any other communication system. Also, instead of carriers provided by a base station a carrier comprising component carriers may be provided by a communication device such as a mobile user equipment. For example, this may be the case in application where no fixed equipment provided but a communication system is provided by means of a plurality of user equipment, for example in adhoc networks. Therefore, although certain embodiments were described above by way of example with reference to certain exemplifying architectures for wireless networks, technologies and standards, embodiments may be applied to any other suitable forms of communication systems than those illustrated and described herein.

It is also noted herein that while the above describes exemplifying embodiments of the invention, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Any of the processes described in the methods of one or more embodiments can be carried out by separate software and/or hardware modules or alternatively a single processing module.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed in there is a further embodiment comprising a combination of one or more of any of the other embodiments previously discussed.

The invention claimed is:

1. An apparatus comprising:
   at least one processor; and
   at least one memory including computer program code, where the at least one memory and the computer program code are configured, with the at least one processor, to cause the apparatus to:
   for mobility management in a cellular system perform:
   determining, with a network node, from a first indication received from at least one mobile communication device that the at least one mobile communication device intends to receive a multimedia broadcast multicast service or is receiving a multimedia broadcast multicast service;
   based on the determining sending, with the network node, to the at least one mobile communication device first information relating to cells, wherein the first information excludes information relating to cells which do not support multimedia broadcast multicast services;
   receiving, with the network node, from the at least one mobile communication device a second indication that the at least one mobile communication device no longer intends to receive the multimedia broadcast multicast service or is no longer receiving the multimedia broadcast multicast service;
   based on the second indication, sending, with the network node, to the at least one mobile communication device second information relating to cells, wherein the second information no longer excludes information related to cells which do not support multimedia broadcast multicast services; and
   in response to the second information, receiving, with the network node, from the at least one mobile communication device a report comprising measurement information based on the second information.

2. The apparatus according to claim 1, wherein the at least one memory including the computer program code is configured with the at least one processor to cause the apparatus, based on the second information, to initiate selecting, on at least one carrier, a cell of the second information for a handover of the at least one mobile communication device.

3. The apparatus according to claim 1, wherein the first information and the second information comprises measurement configuration information for the at least one mobile communication device.

4. The apparatus according to claim 1, wherein the second indication to that the at least one mobile communication device no longer intends to receive the multimedia broadcast multicast service is received in response to a request sent to the at least one mobile communication device.

5. The apparatus according to claim 4, wherein the request sent to the at least one mobile communication device is sent continuously.

6. The apparatus according to claim 5, wherein the request is a multimedia broadcast and multicast service counting request radio resource control message broadcast on an multimedia broadcast and multicast service control channel.

7. The apparatus according to claim 4, wherein the response is a multimedia broadcast and multicast service counting response radio resource control message.

8. The apparatus according to claim 6, wherein at least one of the multimedia broadcast and multicast service counting request radio resource control message and the multimedia broadcast and multicast service counting response radio resource control message are compatible with LTE Rel-10 communication devices.

9. The apparatus according to claim 1, wherein the at least one memory including the computer program code is configured with the at least one processor to cause the apparatus to update a context at the at least one mobile communication device in response to each of the received indications.

10. The apparatus according to claim 1, wherein the at least one memory including the computer program code is configured with the at least one processor to cause the apparatus to update a context at the at least one mobile communication device in response to the second indication.

11. The apparatus according to claim 2, wherein the at least one memory including the computer program code is configured with the at least one processor to cause the apparatus, based on the second indication, to select a cell for the handover of the at least one mobile communication device, on the at least one carrier.

12. The apparatus according to claim 1, wherein a list of neighbor cells is used to include or exclude cells which do not support multimedia broadcast multicast services in the first information and the second information.

13. The apparatus according to claim 12, wherein the list comprises a list of the neighbor cells, on one or more carriers, which do not support the multimedia broadcast multicast service.

14. The apparatus according to claim 12, wherein the list comprises a list of neighbor cells which do support the multimedia broadcast multicast service.

15. An apparatus comprising:
    at least one processor; and
    at least one memory including computer program code, where the at least one memory and the computer program code are configured, with the at least one processor, to cause the apparatus to:
    send to a network node in a cellular system a first indication that the apparatus intends to receive a multimedia broadcast multicast service or is receiving a multimedia broadcast multicast service, wherein the apparatus comprises a mobile communication device;
    in response to the first indication, receive from the network node in the cellular system first information relating to cells, wherein the first information excludes information related to cells which do not support multimedia broadcast multicast services;
    send to the network node in the cellular system a second indication that the apparatus no longer intends to receive the multimedia broadcast multicast service or is no longer receiving the multimedia broadcast multicast service;
    based on the second indication, receive from the network node second information relating to cells, wherein the second information no longer excludes information related to cells which do not support multimedia broadcast multicast services; and
    send to the network node a report comprising cell measurements based on the second information.

16. The apparatus according to claim 15, wherein the at least one memory including the computer program code is configured with the at least one processor to cause the apparatus, to a cell based on the second information.

17. The apparatus according to claim 15, wherein the at least one memory including the computer program code is configured with the at least one processor to cause the apparatus, based on the first information, to prevent performing cell measurements for the cells which do not support the multimedia broadcast multicast service.

18. The apparatus according to claim 15, wherein the at least one memory including the computer program code is configured with the at least one processor to cause the apparatus, based on the second information, to include cell measurements of the cells which do not support the multimedia broadcast multicast service from a report.

19. The apparatus according to claim 15, wherein the at least one memory including the computer program code is configured with the at least one processor to cause the apparatus to receive authorization for excluding measurements of the cells which does not support the multimedia broadcast multicast service.

20. The apparatus according to claim 15, wherein the mobile communication device is in a connected mode.

21. A method, comprising:
determining, by a network node, from a first indication received from at least one mobile communication device that the at least one mobile communication device intends to receive a multimedia broadcast multicast service or is receiving a multimedia broadcast multicast service;
based on the determining, sending, by the network node, to the at least one mobile communication device first information relating to cells, wherein the first information excludes information relating to cells which do not support multimedia broadcast multicast services;
receiving, by the network node, from the at least one mobile communication device a second indication that the at least one mobile communication device no longer intends to receive the multimedia broadcast multicast service or is no longer receiving the multimedia broadcast multicast service;
based on the second indication, sending, by the network node, to the at least one mobile communication device second information relating to cells, wherein the second information no longer excludes information relating to cells which do not support multimedia broadcast multicast services; and
in response to the second information, receiving, by the network node, from the at least one mobile communication device a report comprising measurement information based on the second information.

22. The method according to claim 21, comprising, initiating, based on the second information, selecting, on at least one carrier, a cell of the cells of the second information for a handover of the at least one mobile communication device.

23. The method according to claim 21, wherein the first information and the second information comprises measurement configuration information for the at least one mobile communication device.

24. The method according to claim 21, wherein the second received indication that the at least one mobile communication device no longer intends to receive the multimedia broadcast multicast service is received in response to a request sent to the at least one mobile communication device.

25. The method according to claim 24, wherein the request sent to the at least one mobile communication device is sent continuously.

26. The method according to claim 24, wherein the request is a multimedia broadcast and multicast service counting request radio resource control message broadcast on an multimedia broadcast and multicast service control channel.

27. The method according to claim 26, wherein the response is a multimedia broadcast and multicast service counting response radio resource control message.

28. The method according to claim 27, wherein at least one of the multimedia broadcast and multicast service counting request radio resource control message and the multimedia broadcast and multicast service counting response radio resource control message are compatible with LTE Rel-10 communication devices.

29. The method according to claim 21, comprising updating a context at the at least one mobile communication device in response to each of the received indications.

30. The method according to claim 22, comprising, selecting, based on the second information, a cell of the neighbor cells for the handover of the at least one mobile communication device, on the at least one carrier.

31. The method according to claim 21, wherein a list of neighbor cells is used to include or exclude cells which do not support multimedia broadcast multicast services in the first information and the second information.

32. The method according to claim 31, wherein the list comprises a list of the neighbor cells, on one or more carriers which do not support the multimedia broadcast multicast service.

33. The method according to claim 31, wherein the list comprises list of neighbor cells which do support the multimedia broadcast multicast service.

34. The method according to claim 21, wherein the network node comprises a base station.

35. A method comprising,
sending, by a mobile communication device, to a network node in a cellular system a first indication that the mobile communication device intends to receive a multimedia broadcast multicast service or is receiving a multimedia broadcast multicast service;
in response to the first indication, receiving by the mobile communication device from the network node in the cellular system first information relating to cells, wherein the first information excludes information related to cells which do not support multimedia broadcast multicast services;
sending, by the mobile communication device, to the network node in the cellular system a second indication that the apparatus no longer intends to receive the multimedia broadcast multicast service or is no longer receiving the multimedia broadcast multicast service;
based on the second indication, receiving, by the mobile communication device, from the network node second information relating to cells, wherein the second information no longer excludes information relating to cells which do not support multimedia broadcast multicast services; and
based on the second information, sending, by the mobile communication device, to the network node a report comprising cell measurements based on the second information.

36. The method according to claim 35, comprising, performing, based on the second information, to perform on at least one carrier a handover to a cell of the cells of the second information.

37. The method according to claim 35, comprising: receiving authorization for excluding measurements of cells of the neighbor cells which does not support the multimedia broadcast multicast service.

38. The apparatus according to claim 1, wherein the apparatus is embodied in a base station.

\* \* \* \* \*